United States Patent
McQuillan, Jr.

(10) Patent No.: US 10,947,388 B2
(45) Date of Patent: Mar. 16, 2021

(54) PLASTIC ARTICLES MADE FROM RECYCLED MEDICAL AND OTHER PLASTIC WASTE

(71) Applicant: Triumvirate Environmental, Inc., Somerville, MA (US)

(72) Inventor: John F. McQuillan, Jr., Somerville, MA (US)

(73) Assignee: TRIUMVIRATE ENVIRONMENTAL, INC., Somerville, MA (US)

(*) Notice: Subject to any disclaimer, the term of this patent is extended or adjusted under 35 U.S.C. 154(b) by 0 days.

(21) Appl. No.: 15/413,638

(22) Filed: Jan. 24, 2017

(65) Prior Publication Data

US 2017/0190913 A1 Jul. 6, 2017

Related U.S. Application Data

(63) Continuation of application No. PCT/US2017/012059, filed on Jan. 3, 2017.
(Continued)

(51) Int. Cl.
*C08L 101/00* (2006.01)
*C08J 11/04* (2006.01)
(Continued)

(52) U.S. Cl.
CPC ............ *C08L 101/00* (2013.01); *B29B 17/00* (2013.01); *B29B 17/0042* (2013.01); *C08J 11/04* (2013.01); *C08L 27/06* (2013.01); *C08L 67/02* (2013.01); *C08L 69/00* (2013.01); *B29B 9/06* (2013.01); *B29C 48/04* (2019.02); *B29L 2031/753* (2013.01); *C08J 2300/30* (2013.01); *C08L 2207/062* (2013.01); *C08L 2207/20* (2013.01); *Y02P 20/143* (2015.11); *Y02W 30/62* (2015.05)

(58) Field of Classification Search
CPC ........ C08L 101/00; C08L 27/06; C08L 67/02; C08L 69/00; C08J 11/04; B29B 17/00; B29B 17/0042
See application file for complete search history.

(56) References Cited

U.S. PATENT DOCUMENTS

| 4,153,514 A | 5/1979 | Garrett et al. |
| 5,075,057 A | 12/1991 | Hoedl |

(Continued)

OTHER PUBLICATIONS

United States Environmental Protection Agency, "Handbook—Recycling and Reuse of Material Found on Superfund Sites", Center for Environmental Research Information Office of Research and Development, U.S. Environmental Protection Agency, Cincinnati, Ohio, Sep. 1994, 92 pgs.
(Continued)

*Primary Examiner* — Peter D. Mulcahy
(74) *Attorney, Agent, or Firm* — Arent Fox LLP

(57) ABSTRACT

Blends of recycled plastic materials and plastic products made therefrom are provided. The blends combine a high fraction of recycled medical waste with mixed recycled plastics, such as polyolefins or carpet waste. Also provided are methods for processing a heterogeneous waste stream such as medical waste to yield a homogenous material capable of blending with other materials and extrusion to form useful plastic products such as structural materials and consumer articles.

12 Claims, 3 Drawing Sheets

Related U.S. Application Data

(60) Provisional application No. 62/301,259, filed on Feb. 29, 2016, provisional application No. 62/273,533, filed on Dec. 31, 2015.

(51) Int. Cl.

| | | |
|---|---|---|
| *B29B 17/00* | (2006.01) | |
| *C08L 27/06* | (2006.01) | |
| *C08L 67/02* | (2006.01) | |
| *C08L 69/00* | (2006.01) | |
| *B29B 9/06* | (2006.01) | |
| *B29L 31/00* | (2006.01) | |
| *B29C 48/04* | (2019.01) | |

(56) References Cited

U.S. PATENT DOCUMENTS

| | | |
|---|---|---|
| 5,342,421 A | 8/1994 | Breu |
| 5,608,136 A | 3/1997 | Maezawa et al. |
| 5,895,790 A | 4/1999 | Good |
| 6,039,774 A | 3/2000 | McMullen et al. |
| 6,143,136 A | 11/2000 | Aulbaugh et al. |
| 6,226,889 B1 | 5/2001 | Aulbaugh et al. |
| 6,244,198 B1 | 6/2001 | Suominen |
| 6,306,318 B1 | 10/2001 | Ricciardelli |
| 6,861,568 B1 | 3/2005 | Guffey et al. |
| 6,869,687 B2 | 3/2005 | Tadokoro et al. |
| 7,081,217 B2 | 7/2006 | Treleaven |
| 7,137,802 B2 | 11/2006 | Bacher et al. |
| 7,462,648 B2 | 12/2008 | Hasegawa et al. |
| 7,642,394 B1 | 1/2010 | Carle et al. |
| 8,092,205 B2 | 1/2012 | Witlin et al. |
| 8,252,216 B2 | 8/2012 | Abramson et al. |
| 8,426,480 B2 | 4/2013 | Ji et al. |
| 8,450,382 B2 | 5/2013 | Riise et al. |
| 8,568,645 B2 | 10/2013 | Nelson et al. |
| 8,993,644 B2 | 3/2015 | Ji |
| 2008/0141589 A1* | 6/2008 | Farneman ............ B01J 19/126 48/197 FM |
| 2008/0214699 A1* | 9/2008 | Halahmi ............... B29B 7/005 523/222 |
| 2011/0068036 A1 | 3/2011 | Ji et al. |
| 2011/0071230 A1 | 3/2011 | Ji |
| 2013/0116628 A1 | 5/2013 | Kulshrestha et al. |
| 2014/0024778 A1 | 1/2014 | Alsewailem et al. |
| 2014/0150842 A1 | 6/2014 | Nosker et al. |

OTHER PUBLICATIONS

T.P. Sullivan, "Thermal Desorption: A Technology Review", Texas A&M University, Jul. 22, 1997, 93 pgs.

G.G. Hawk, et al., "High vacuum indirectly-heated rotary kiln for the removal and recovery of mercury from air pollution control scrubber waste", Waste Management, (1998), vol. 18, pp. 461-466.

RLC Technologies, Inc., Separation and Recovery of Oil from Oily Waste Materials Using Anaerobic Thermal Desrotpion Unit Technology, Glen Allen VA, Dec. 1, 2012, 7 pgs.

Foster Wheeler Environmental Corporation and Battelle Corporation, "Overview of Thermal Desorption Technology", Naval Facilities Engineering Service Center, Port Hueneme, California, Jun. 1998, 32 pgs.

Communication from the European Patent Office in counterpart European Application No. 17733950.4, dated Jul. 2, 2019.

\* cited by examiner

PLASTIC ARTICLES MADE FROM
RECYCLED MEDICAL AND OTHER
PLASTIC WASTE

CROSS REFERENCE TO RELATED APPLICATIONS

This application is a continuation of PCT/US2017/012059, filed 3 Jan. 2017 and entitled "Plastic Articles Made from Recycled Medical and Other Plastic Waste", which claims the priority of U.S. Provisional Application No. 62/273,533, filed 31 Dec. 2015 and entitled "Plastic Articles Made from Recycled Medical and Other Plastic Waste", and of U.S. Provisional Application No. 62/301,259, filed 29 Feb. 2016 and entitled "Plastic Articles Made from Recycled Medical and Other Plastic Waste". All applications are hereby incorporated by reference in their entireties.

BACKGROUND

Medical waste contains a variety of materials, especially plastics, but also fibrous materials such as paper, which can be recycled to yield useful products and to reduce the accumulation of such waste in landfills or the need for incineration which causes pollution. Nevertheless, medical waste is a very heterogeneous material, which makes it difficult to recycle as is or to blend with other materials to produce a homogeneous product. There is a need to develop uses for recycled medical waste and other recycled plastic materials, including methods for their processing and recycling.

SUMMARY OF THE INVENTION

The invention provides blends of recycled plastic materials and plastic products made therefrom. The blends combine a high fraction of recycled medical waste with mixed recycled plastics, such as polyolefins or carpet waste. The invention further provides methods for processing a heterogeneous waste stream to yield a homogenous material capable of blending with other materials and extrusion to form useful plastic products such as structural materials and consumer articles.

One aspect of the invention is a blend of recycled plastics containing at least about 40% by weight of recycled medical waste, or another heterogeneous recycled material, and at least about 20% by weight of one or more other recycled plastics. The blend can further contain one or more additives, such as blending agents, colorants, binders, or fillers. One embodiment of the blend contains about 70 wt % recycled medical waste and about 30% of one or more other recycled plastics. Another embodiment contains about 50 wt % recycled medical waste and about 50% other recycled plastic. In yet another embodiment the other recycled plastic includes recycled carpet. In certain embodiments, the blend contains one or more of polyethylene, polypropylene, and polyester. In certain embodiments, the blend is formed into a plastic product, such as a lumber product, landscape product, deck product, fence product, or railroad tie.

Another aspect of the invention is a method of making a recycled plastic material. The method includes the steps of: (a) providing a recycled medical waste material and one or more recycled plastic materials; (b) sterilizing the recycled medical waste material; (c) grinding and blending the product of step (b); (d) blending the product of step (c) with the one or more recycled plastic materials; and (e) optionally pelletizing or grinding the product of step (d). In embodiments, the method further includes: (f) forming a melt from the product of step (d) or step (e); and (g) forming the melt into a plastic product, such as by extrusion or molding.

The invention can further be summarized through the following list of embodiments.

1. A blend of recycled plastics comprising at least about 40% by weight of recycled medical waste and at least about 20% by weight of one or more other recycled plastics.
2. The blend of embodiment 1, further comprising one or more additives selected from blending agents, colorants, and fillers.
3. The blend of embodiment 2 comprising ethylene vinyl acetate as a binder and carbon black as a colorant.
4. The blend of any of the preceding embodiments, wherein the recycled plastics comprise about 70 wt % recycled medical waste and about 30% of one or more other recycled plastics.
5. The blend of any of embodiments 1-3, wherein the recycled plastics comprise about 50 wt % recycled medical waste and about 50% other recycled plastic.
6. The blend of embodiment 4 or 5, wherein the other recycled plastic comprises recycled carpet.
7. The blend of any of the preceding embodiments that comprises two or more polymers selected from the group consisting of polyethylene, polypropylene, and polyester.
8. The blend of embodiment 7 that comprises polyethylene, polypropylene, and polyester.
9. The blend of embodiment 7 further comprising one or more polymers selected from the group consisting of polyvinyl chloride, polycarbonate, and polystyrene.
10. The blend of any of the preceding embodiments that is in granular or powder form.
11. The blend of any of the preceding embodiments that is extruded or molded to form a plastic product.
12. The blend of embodiment 11, wherein the plastic product is selected from the group consisting of lumber products, landscape products, deck products, fence products, and railroad ties.
13. A method of making a recycled plastic material, the method comprising the steps of:
   (a) providing a recycled medical waste material and one or more recycled plastic materials;
   (b) sterilizing the recycled medical waste material;
   (c) shredding and blending the product of step (b);
   (d) blending the product of step (c) with the one or more recycled plastic materials; and
   (e) optionally pelletizing or grinding the product of step (d).
14. The method of embodiment 13 further comprising:
   (f) forming a melt from the product of step (d) or step (e); and
   (g) extruding the melt to form a plastic product.
15. The method of embodiment 14, wherein the plastic product is a plastic lumber product.
16. The method of any of embodiments 13-15, further comprising between steps (b) and (c) the step of:
   (b1) removing metal objects from the sterilized medical waste material.
17. The method of embodiment 13, wherein the blending of step (d) combines about 50 wt % medical waste with about 50 wt % of non-medical waste recycled plastic material.
18. The method of embodiment 13, wherein the blending of step (d) combines about 60 wt % medical waste with about 40 wt % of non-medical waste recycled plastic material.

19. The method of embodiment 13, wherein the blending of step (d) combines about 70 wt % medical waste with about 30 wt % of non-medical waste recycled plastic material.

20. The method of any of embodiments 13-19, wherein the blending of step (d) includes adding about 1 wt % of a blending agent.

21. The method of any of embodiments 13-20, wherein the blending of step (d) includes adding a colorant.

DETAILED DESCRIPTION OF THE INVENTION

The invention provides plastic materials made using recycled medical waste and methods of processing medical waste or other heterogeneous waste streams to form homogenous composite plastic materials in raw form or as finished products.

Medical waste for use in the invention is typically in the form of bagged or boxed plastic, paper, and metal articles that have contacted patient materials or samples, or that have been implanted in a patient, and are therefore suspected of potential contamination with pathogens or toxic materials used in medical procedures, such as pharmaceutical or diagnostic agents. The waste is very heterogeneous and may contain needles, tubing, plastic syringes, and the like. Medical waste can also include materials used in the production of biotechnology products, such as cell culture materials, filters, and chromatography columns. The heterogeneity of recycled medical waste makes it nearly impossible to use to create useful homogeneous materials or new articles without significant processing and blending with other materials. In addition to recycling medical waste, the methods of the present invention also can be employed with heterogeneous waste streams, such as waste materials containing a combination of plastic, fibrous materials such as paper, cardboard, or wood, and small metal objects. Preferably the heterogeneous waste contains at least about 20%, 30%, 40%, 50%, 60%, or 70% by weight of plastic material, and only small amounts, such as less than about 50%, 40%, 30%, 20%, 15%, 10%, 5%, 2%, or 1% by weight of fibrous material, and preferably containing only small amounts of metal or other hard materials, such as less than about 20%, 15%, 10%, 5%, 2%, or 1% by weight. Optionally, the waste can be hand selected or certain types of materials selectively removed by attendants who load the material into the process.

Figure 1:
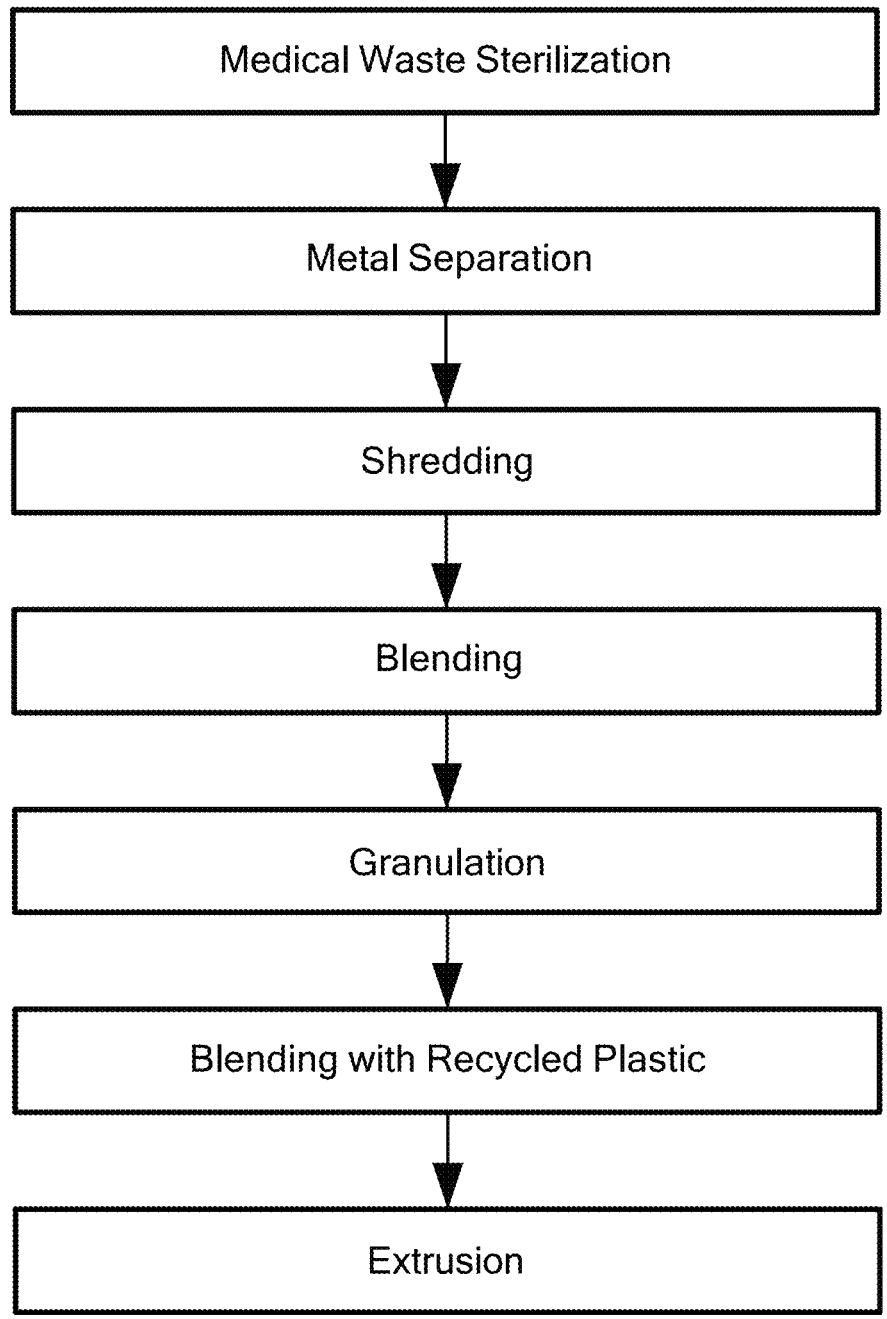
FIG. 1 shows a flow diagram of a method of processing recycled medical waste, blending it with another recycled plastic material, and forming a plastic product from the blend.

FIG. 1 shows a diagram of an embodiment of a recycling method of the present invention. Received medical waste is first sterilized prior to further handling. Metal objects are advantageously removed early in the process, so as to avoid interference with machinery or their accidental inclusion in final product. For example, ferromagnetic materials can be removed by exposing them to a magnet, which separates them from the non-ferromagnetic material. Then, the medical waste is shredded into small pieces so as to enhance further processing. One or more grinding processes also can be performed prior to or after shredding. After the material has been reduced to small pieces, it is blended, preferably after heating to melt the low melt plastics in the mixture. After blending, the material can be cooled and granulated to produce a raw material that can be stored and sold for other uses, or can be directly admixed with other materials, such as recycled nonmedical plastic waste, and/or with new (i.e., non-recycled) polymer materials. Blending can be enhanced by the addition of a polymer blending agent. The combined waste materials, and optionally non-waste materials, are then compounded and can be formed into a pelleted or powdered raw material. The raw material can then be further processed, such as by melting and extrusion or molding to form a plastic product. Once a melt is formed containing the medical waste, the melt can be processed to form commercial objects, such as structural lumber or building materials, railroad ties, landscaping materials, or other objects using any standard method for creating plastic articles.

Sterilization may include application of heat, chemicals, and/or radiation. For example, the sterilization process can include the addition of CaO to recycled medical waste. The sterilization process preferably results in at least a log 6 kill factor. After sterilization, undesired materials may be removed by magnetic separation, visual inspection and manual removal, or by other means. For example, the process can use rollers, inspection, and electromagnets for separating ferrous and/or nonferrous metals from the recycled medical waste.

Mechanical mixing steps used to combine and reduce the size of objects found in the medical waste stream can include various mixing and processing steps, such as grinding, shredding, heating, cooling, melting, or compounding of a melt with other materials. The medical waste material can be densified so as to render it suitable for gravity feed processing. Fibrous or other filler materials can be added to improve mechanical properties. High-speed grinding can be performed. Blended medical waste can be heated at one or more temperatures to achieve a suitable viscosity. Blends can be melted and extruded at a temperature such as 300° F., 310° F., 320° F., 330° F., 340° F., 350° F., 360° F., 370° F., 380° F., 390° F., 400° F. or 410° F. A compounding extruder can be used in the extrusion process. In certain embodiments, the extrusion process produces an extruded material containing a core of high melt polymers and an outer layer of lower melt polymers surrounding the core.

The invention includes compositions of matter in the form of raw materials and finished products such as lumber, landscaping timbers, railroad ties, decking material, plastic-containing furniture, playground structures, and construction materials such as building framing materials, structural members, roofing, and flooring. In a preferred embodiment, the surface of products made according to the invention are paintable. For example, the surface can have a suitable level of hydrophobicity, wettability, and surface charge as to render it adherent to oil- or water-based paint applied as a spray, or by brush, roller, or dipping. Products can also be colored by inclusion of a colorant (e.g., carbon black) or dye in the blend, rendering the product made therefrom colored throughout.

The materials of the invention can contain a combination of polymers obtained from processed and sterilized medical waste, optionally combined with additional polymers sourced from other recycled materials, such as carpet waste, or new polymer materials. In embodiments, the medical waste comprises or consists essentially of polypropylene (PP) and/or polyethylene (PE, which may include high density polyethylene (HDPE)). In certain embodiments, carpet waste comprises or consists essentially of polyethylene terephthalate (PET) and or PP. Additional polymers that can be added as new materials or in the form of recycled plastics include polyamide (PA), nylon, polycarbonate (PC), polyvinylchloride (PVC), polystyrene (PS), polyester, liquid crystal polymers (LCP), and mixtures thereof, as well as copolymers such as ethylene vinyl acetate (EVA) useful to promote blending.

In certain embodiments, materials of the invention include recycled medical waste in an amount by weight of at least 20%, 30%, 40%, 45%, 48%, 49%, 49.5%, 50%, 51%, 55%, 60%, 65%, 70%, 75%, or 80%. In certain embodiments, materials of the invention include one or more other recycled plastic materials, or new, non-recycled plastic materials, in an amount by weight of at least 20%, 30%, 40%, 45%, 48%, 49%, 49.5%, 50%, 51%, 55%, 60%, 65%, 70%, 75%, or 80%. Materials of the invention also can include one or more blending agents (e.g., EVA) in an amount by weight of 0.1-10%, such as 0.5%, 1%, 1.5%, or 2%. The materials of the invention further can contain one or more types of filler or inclusions, such as polymer fibers, carbon fibers, graphene, metals, inorganic oxides, nanoparticles, nanotubes, and the like. Colorants such as carbon black or dyes also can be added. Preferred blends according to the invention include a blend of 20-80% by weight recycled medical waste and 20-80% by weight recycled polyolefin (primarily a blend of PE and PP), such as 50% recycled medical waste and 50% recycled polyolefin, or 55% recycled medical waste and 45% recycled polyolefin, or 60% recycled medical waste and 40% recycled polyolefin, or 65% recycled medical waste and 35% recycled polyolefin, or 70% recycled medical waste and 30% recycled polyolefin, or 75% recycled medical waste and 25% recycled polyolefin, or 80% recycled medical waste and 20% recycled polyolefin, or 45% recycled medical waste and 55% recycled polyolefin, 40% recycled medical waste and 60% recycled polyolefin, or 30% recycled medical waste and 70% recycled polyolefin. Other preferred blends include a blend of 20-80% recycled medical waste and 20-80% recycled carpet material, such as motor vehicle trunk liner material (a blend of approximately 45% PP and 55% PET), such as 50% recycled medical waste and 50% recycled carpet material, or 55% recycled medical waste and 45% recycled carpet material, or 60% recycled medical waste and 40% recycled carpet material, or 65% recycled medical waste and 35% recycled carpet material, or 70% recycled medical waste and 30% recycled carpet material, or 75% recycled medical waste and 25% recycled carpet material, or 80% recycled medical waste and 20% recycled carpet material, or 45% recycled medical waste and 55% recycled carpet material, 40% recycled medical waste and 60% recycled carpet material, or 30% recycled medical waste and 70% recycled carpet material. For the above described blends, 100% refers to the weight of recycled plastic materials in the blend. In addition, small amounts (less than about 1%, less than about 2%, or less than about 5% by weight of the final composition) of one or more colorants and one or more blending agents and one or more fillers can be added.

Materials of the invention can be provided in different forms, including pellets, powder, as well as extruded structural members or lumber in the form of boards, sheets, or any other desired shape. The materials can be produced in a variety of different particle sizes, useful as a raw material for different purposes, such as a mesh size of 5, 6, 7, 8, 9, 10, 15, 20, 25, 30, 35, 40, 45, 50, 60, 70, 80, 90, or 100 mesh.

EXAMPLES

Example 1

Preparation of Plastic Blends Containing Recycled Medical Waste

Four different blends of recycled plastic materials were prepared. The composition of the blends is shown in Table 1 below. In Table 1, 100% represents the total of all recycled plastic materials, without including additives such as blending agents or colorants.

TABLE 1

Recycled Plastic Blends.

| Blend | Recycled Medical Waste | Mixed Recycled Plastic | Recycled Carpet |
|---|---|---|---|
| A | 70 wt % | 30 wt % | 0 |
| B | 50 wt % | 0 | 50 wt % |
| C | 50 wt % | 50 wt % | 0 |
| D | 0 | 70 wt % | 30 wt % |

The recycled medical waste was prepared by sterilizing the medical waste, removing metals, blending the medical waste with the indicated amounts of other recycled plastic materials. The mixed recycled plastic contained about 30 wt % polyolefin (e.g., PE and PP) with the remainder being predominately PC, PVC, and/or PET. The recycled carpet was motor vehicle trunk liner cuttings containing approximately 45 wt % PP and 55 wt % PET. The final material of each blend additionally contained approximately 2% carbon black as colorant, as well as 1% or less of EVA as blending agent.

Figure 2:
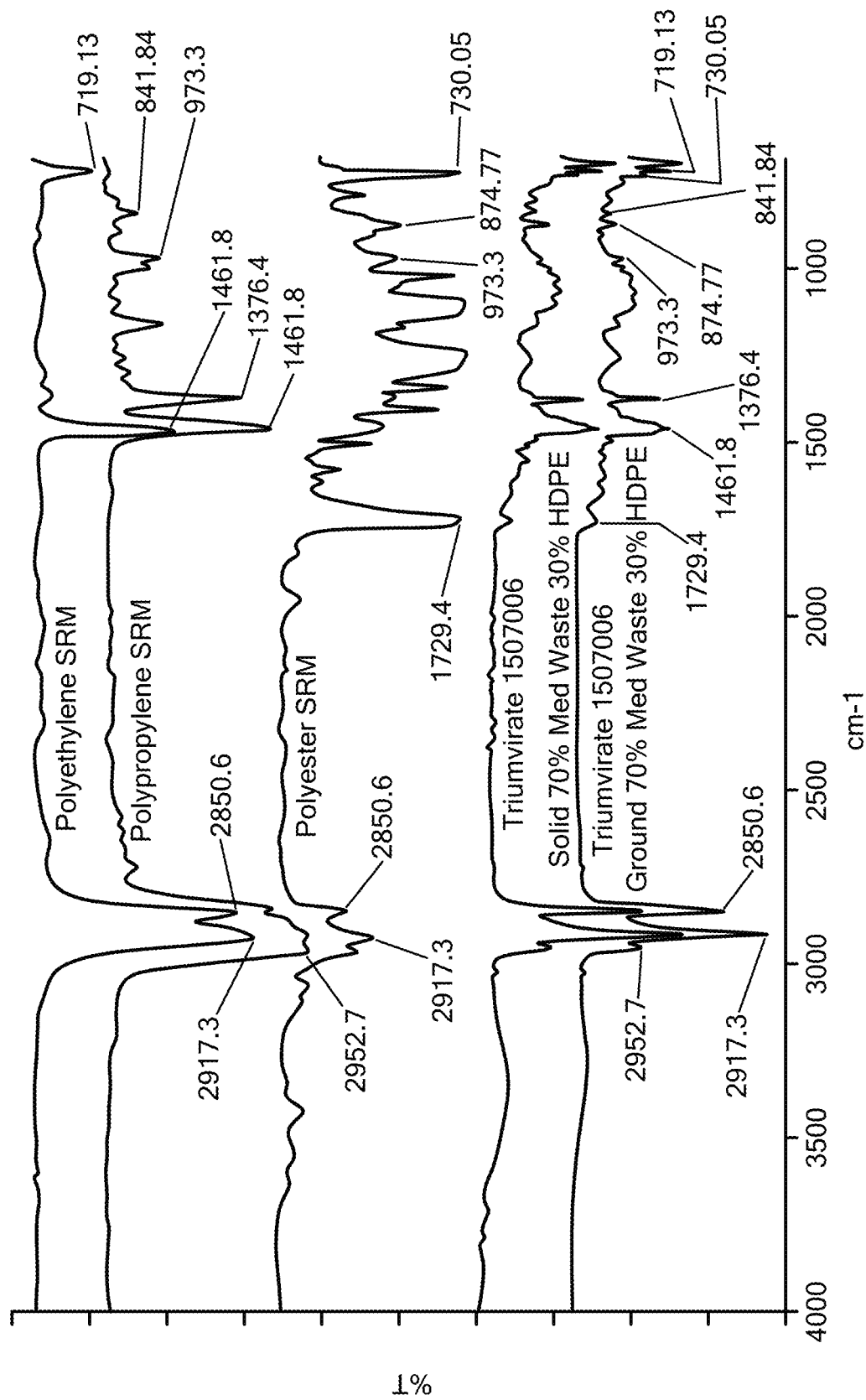
FIG. 2 shows transmission infrared spectra of a material containing about 70% recycled medical waste and about 30% mixed recycled plastics (in solid form and ground form), together with standard reference materials (SRM) of polyethylene (PE), polypropylene (PP), and polyester.

FIG. 2 shows transmission infrared spectra of Blend A in solid form and ground form, together with standard reference materials (SRM) of PE, PP, and polyester. The blend apparently contained contributions from PE, PP, and polyester, in the relative amounts of PE >PP>polyester. The spectra and composition of ground and solid materials appeared essentially identical.

Figure 3:
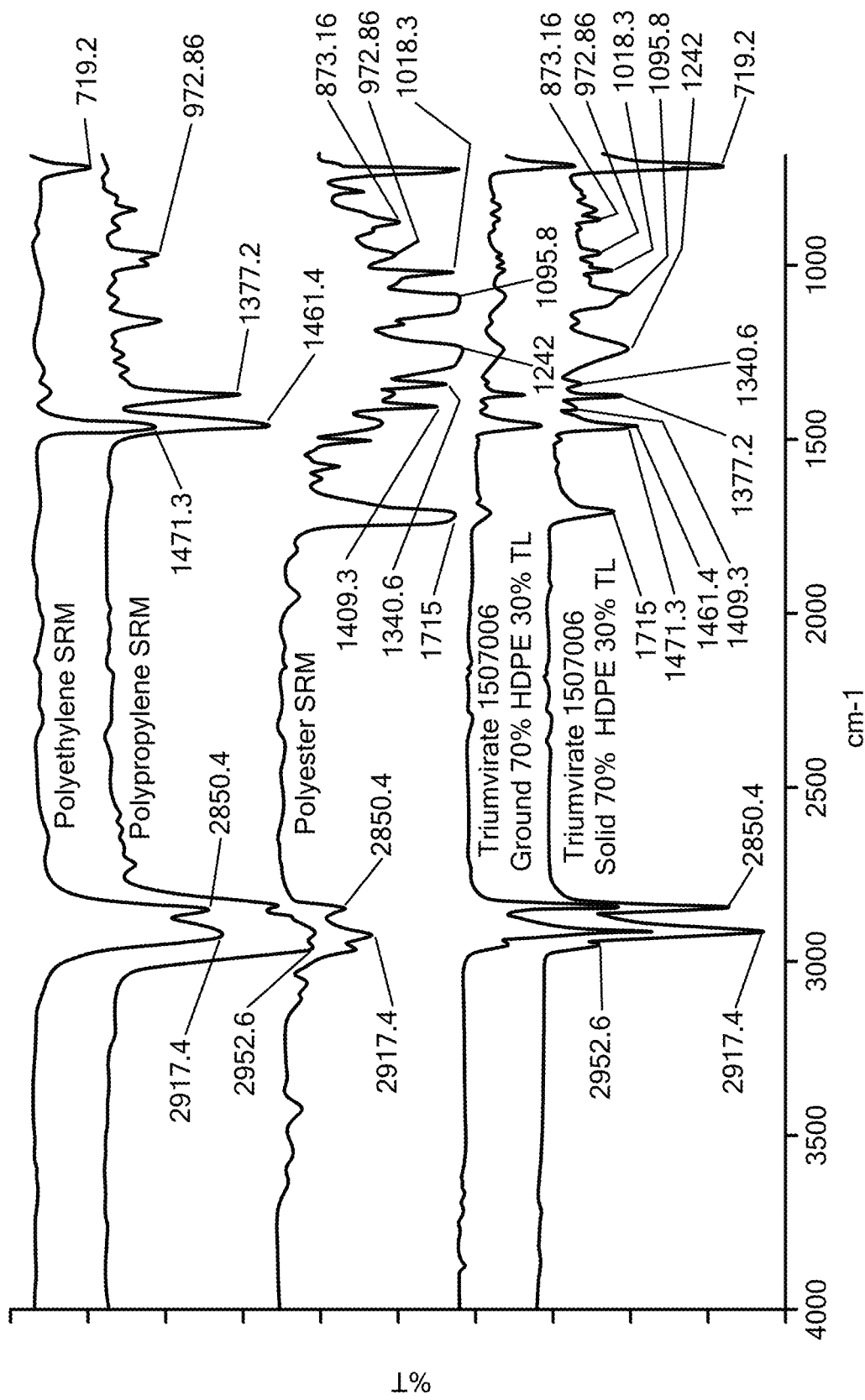
FIG. 3 shows transmission infrared spectra of a material containing about 30% recycled medical waste and about 70% mixed recycled plastics (in solid form and ground form), together with standard reference materials (SRM) of PE, PP, and polyester.

FIG. 3 shows transmission infrared spectra of Blend D in solid form and ground form, together with standard reference materials (SRM) of PE, PP, and polyester. TL refers to recycled trunk liner (carpet) material. The blend showed contributions from PE, PP, and polyester, with a higher amount of polyester than Blend A. The relative amounts appeared to be PE>polyester>PP. Since PET was present in the carpet material, and PET is a type of polyester, at least a portion of the polyester spectrum observed in the blend was probably due to PET.

The Blends A and D, whose IR spectra are shown in FIGS. 2 and 3, were ashed to remove all organic material, leaving only inorganic filler or residue, which was identified and quantified by energy dispersive X-ray spectroscopy (EDXS). The results are shown in Table 2 below for the material extruded in the form of lumber as well as extruded, reground material.

TABLE 2

| | X-Ray Spectroscopy | | | |
|---|---|---|---|---|
| Oxide | Blend A 70% Med Waste 30% HDPE (Regrind) | Blend A 70% Med Waste 30% HDPE (Lumber) | Blend D 70% HDPE 30% TL (Regrind) | Blend D 70% HDPE 30% TL (Lumber) |
| Na2O | 4.1 | 3.9 | 2.3 | 2.6 |
| MgO | 3.1 | 3.2 | 2.6 | 2.9 |
| Al2O3 | 5.3 | 5.6 | 5.1 | 4.8 |
| SiO2 | 23.8 | 22.8 | 9.3 | 6.6 |
| P2O5 | 0.8 | 0.8 | 1.5 | 2.1 |
| SO3 | 2.8 | 2.1 | 3.7 | 2.7 |
| Cl2O7 | 20.2 | 21.1 | 0.4 | 0.1 |
| K2O | 0.4 | 0.4 | 0.1 | 0.1 |
| CaO | 28.1 | 29.3 | 23.8 | 15.2 |
| TiO2 | 3.2 | 3.2 | 42.1 | 36.0 |
| FeO | 1.5 | 1.6 | 1.4 | 1.4 |
| Cu2O | — | — | 0.3 | 0.5 |
| NiO | — | — | — | — |
| ZnO | 0.6 | 0.4 | 0.4 | 0.3 |

Example 2

Preparation and Testing of Plastic Lumber Products Containing Recycled Medical Waste Blends A-C described in Example 1 were extruded to form plastic lumber products in different formats, including nominal 2×6 inch boards (actual dimensions 1.5 inches×5.5 inches×108 inches length) and nominal 4×4 inch posts (actual dimensions 3.5 inches×3.5 inches×108 inches). These products were subjected to mechanical testing according to standard ASTM protocols, and the results are described below.

ASTM D-6117-13e1, Method A, Fastener Withdrawal

Fastenal Premium All Purpose Deck Screws (#9, 11×2.5 in) were installed in plastic lumber products on a face, edge, and cut end of each lumber specimen. The specimen was then conditioned at the indicated conditions for 24-48 hours prior to testing. Increasing load was applied to the installed screws until either the screw or the lumber substrate failed, and the load at time of failure is reported in Table 3 as the average of 10 determinations (average of 30 determinations for the 73° F., 50% RH condition).

TABLE 3

| | Screw Withdrawal Test. | | |
|---|---|---|---|
| Blend | Lumber Form | Conditioning | Avg. Maximum Load (lb) |
| A | 2 × 6 in | 73° F., 50% RH 24-48 hr | 1410 (side) 1436 (edge) 817 (end) |
| A | 2 × 6 in | 99° F., 50% RH 12 hr | 1140 (side) |
| A | 2 × 6 in | −4° F., 12 hr | 1727 (side) |
| A | 2 × 6 in | 70° F., water soak 24 hr | 1419 (side) |
| B | 2 × 6 in | 73° F., 50% RH 24-48 hr | 1410 (side) 1429 (edge) 927 (end) |
| B | 2 × 6 in | 99° F., 50% RH 12 hr | 1207 (side) |
| B | 2 × 6 in | −4° F., 12 hr | 1777 (side) |
| B | 2 × 6 in | 70° F., water soak 24 hr | 1438 (side) |
| C | 2 × 6 in | 73° F., 50% RH 24-48 hr | 1782 (side) 1799 (edge) 1358 (end) |
| C | 2 × 6 in | 99° F., 50% RH 12 hr | 1449 (side) |
| C | 2 × 6 in | −4° F., 12 hr | 1702 (side) |
| C | 2 × 6 in | 70° F., water soak 24 hr | 1685 (side) |
| A | 4 × 4 in | 73° F., 50% RH 24-48 hr | 1203 (side) 1156 (edge) 613 (end) |
| A | 4 × 4 in | 99° F., 50% RH 12 hr | 995 (side) |
| A | 4 × 4 in | −4° F., 12 hr | 1691 (side) |
| A | 4 × 4 in | 70° F., water soak 24 hr | 1179 (side) |
| B | 4 × 4 in | 73° F., 50% RH 24-48 hr | 1561 (side) 1491 (edge) 1002 (end) |
| B | 4 × 4 in | 99° F., 50% RH 12 hr | 1194 (side) |
| B | 4 × 4 in | −4° F., 12 hr | 1775 (side) |
| B | 4 × 4 in | 70° F., water soak 24 hr | 1356 (side) |

Fastener stability was best for Blend C in the 2×6 format, while for the 4×4 format fastener stability was better for Blend B than for Blend A. In both formats, lowering the temperature increased fastener stability, and raising the temperature weakened fastener stability. Soaking in water had little or no effect.

ASTM D-6109-13, Method B, Flexural Properties Under Third Point Loading

Plastic lumber specimens were conditioned for at least 88 hours at 73° F., 50% relative humidity (RH). Load was increased until the board failed due to flexural rupture. For the 2×6 lumber the support span was 88.00 inches, the load span was 29.31 inches, and the load was applied to the nominal 2 inch face. For the 4×4 lumber the support span was 56.00 inches and the load span was 18.64 inches. Results presented in Table 4 are average values from five specimens.

TABLE 4

| | Third Point Loading Test. | | | |
|---|---|---|---|---|
| Blend | Lumber Form | Maximum Load (lbf) | Maximum Strain (in/in) | Flexural Strength MOR (psi) |
| B | 2 × 6 in | 1179 | 0.005 | 1767 |
| C | 2 × 6 in | 851 | 0.008 | 1509 |
| A | 4 × 4 in | 1436 | 0.010 | 1854 |
| B | 4 × 4 in | 1179 | 0.006 | 1531 |

Flexural stability was greatest for Blend A, and least for Blend C.

ASTM D-6108-13, Method B, Compressive Properties

Lumber specimens were subjected to compressive loading perpendicular to the length of the boards. Load was applied to the nominal 2 inch faces of the 2×6 lumber. Load was applied until 3% strain was achieved. Results presented in Table 5 are average values from five specimens.

TABLE 5

| | | Compressive Properties. | | |
|---|---|---|---|---|
| Blend | Lumber Form | Stress at 3% Strain (psi) | Modulus of Elasticity (psi) | Secant Modulus (psi) |
| B | 2 × 6 in | 3089 | 125464 | 126421 |
| C | 2 × 6 in | 3134 | 117303 | 116128 |
| A | 4 × 4 in | 1661 | 72586 | 73347 |
| B | 4 × 4 in | 2144 | 78044 | 77585 |

Resistance to compression was similar for Blends A-C.
ASTM D-6111-13a, Bulk Density and Specific Gravity The bulk density and specific gravity of plastic lumber specimens were measured by water displacement at 74° F. The lumber was preconditioned according to ASTM D618 prior to testing. One inch pieces of the lumber specimens were cut with a miter saw, and cut edges were covered with packaging tape. Results presented in Table 6 are average values from five specimens.

TABLE 6

| | Specific Gravity and Density. | | |
|---|---|---|---|
| Blend | Lumber Form | Bulk Specific Gravity | Bulk Density (lb/ft$^3$) |
| A | 2 × 6 in | 1.00 | 62.48 |
| B | 2 × 6 in | 1.11 | 69.33 |
| C | 2 × 6 in | 0.93 | 58.22 |
| A | 4 × 4 in | 0.95 | 59.16 |
| B | 4 × 4 in | 1.06 | 66.22 |

The bulk specific gravity and density were greatest for Blend B.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

What is claimed is:

1. A method of making a paintable plastic commercial object, the method comprising the steps of:
   (a) providing a medical waste material, a blending agent, and one or more recycled plastic materials;
   (b) sterilizing the medical waste material, wherein the sterilization results in at least a log 6 kill factor;
   (c) shredding and blending the product of step (b);
   (d) adding a blending agent and the one or more recycled plastic materials to the product of step (c);
   (e) blending the product of step (d);
   (f) optionally pelletizing or grinding the product of step (e);
   (g) forming a melt from the product of step (e) or step (f); and
   (h) extruding the melt to form a paintable plastic commercial object, wherein the commercial object is selected from lumber, landscaping timbers, railroad ties, decking material, plastic-containing furniture, playground structures, building framing materials, structural members, roofing, or flooring.

2. The method of claim 1, wherein the paintable plastic commercial object is adherent to oil or water based paint.

3. The method of claim 1, wherein the blending of step (e) combines about 50 wt % medical waste with about 50 wt % of non-medical waste recycled plastic material.

4. The method of claim 1, wherein the blending of step (e) combines about 60 wt % medical waste with about 40 wt % of non-medical waste recycled plastic material.

5. The method of claim 1, wherein the blending of step (e) combines about 70 wt % medical waste with about 30 wt % of non-medical waste recycled plastic material.

6. The method of claim 1, wherein in step (d) about 1 wt % of the blending agent is added.

7. The method of claim 1, wherein the blending of step (e) includes adding a colorant.

8. The method of claim 1, further comprising removal of metal objects by magnetic separation.

9. The method of claim 1, wherein the blending agent is ethylene vinyl acetate.

10. The method of claim 1, wherein the product of step (d) contains at least 30 wt % of recycled medical waste material.

11. The method of claim 1, wherein the sterilization is achieved by an application of a chemical.

12. The method of claim 1, wherein the sterilization is achieved by an application of a calcium oxide (CaO).

* * * * *